Feb. 19, 1957 W. C. HIRONIMUS 2,782,042

TONE ARM WITH A CUTTING AND PLAY-BACK NEEDLE

Filed Oct. 5, 1951

INVENTOR.
WALTER C. HIRONIMUS
BY
Ostrolenk & Faber
ATTORNEYS 2,782,042

TONE ARM WITH A CUTTING AND PLAY-BACK NEEDLE

Walter C. Hironimus, Charlotte, Mich., assignor to Wilcox-Gay Corporation, Charlotte, Mich., a corporation of Michigan Application October 5, 1951, Serial No. 249,977

1 Claim. (Cl. 274—23)

My present invention relates to a home recording device and more particularly to a disc sound recorder and play-back unit utilizing a single tone arm and a single dual purpose stylus for both making the record and playing back the record. Heretofore in application Serial No. 158,637, now abandoned, there was disclosed a structure utilizing a single tone arm for this purpose. However, the tone arm was so constructed that although it had a single operating cartridge which was utilized for both the recording and the play-back, two separate needles placed in two distinct recesses of the operating cartridge were there used, of which one was used for making the record and the other for playing back the record.

In the above-mentioned application Serial No. 158,637, the cutting needle was placed in a recess so that it would work in a bearing surface of the crystal contained in the operating cartridge, thus making it necessary to place the reproducing needle in a second recess where it would work against a more or less square surface instead of a bearing surface inside the crystal of the operating cartridge. It was found that this arrangement produced a serious loss in high frequencies on reproduction due to the fact that the play-back needle in conjunction with the crystal acts as a low pass filter, that is, it produces attenuations above a certain frequency.

Essentially, my invention is an improvement over the application Serial No. 158,637 in that while as above-mentioned this application Serial No. 158,637 provided for two needles, a cutter and a reproducer of which the second was working against a more or less square surface instead of a bearing surface inside the cartridge crystal, thus producing a considerable loss at high frequencies, the present invention contemplates the use of only one stylus for cutting and reproducing, working against a bearing surface inside the cartridge crystal, thus improving the high frequency response. This stylus is essentially a combination of a cutting needle and of a play-back needle both having the same shank.

The main object of my present invention is, therefore, a stylus having a single shank and a pair of needles, one a disc sound recorder, the other a disc sound reproducer.

Another object of my invention is a stylus which does not produce any jolting action.

In the operation of the recording play-back device disclosed in application Serial No. 158,637, the tone arm is so arranged that the rear end thereof, i. e., the end opposite the stylus is not only arranged to pivot in a horizontal direction in order to enable the tone arm to traverse a horizontal disc, but is also arranged so that it may slide vertically, the tone arm being also pivoted for rotation in a vertical plane.

When the pivot end of the tone arm is raised, then the tone arm is engaged with an appropriate mechanical drive adapting it for operation as a record maker. In this case, the tone arm makes a substantial angle with the turn table.

The dual purpose stylus is so mounted on the tone arm that when the tone arm is at this substantial angle, the cutting needle engages the record on the turn table. The play-back needle mounted on the same shank of the cutting needle is on the same line pivot post cutting needle but is nearer to the pivot post.

The stylus is so constructed that when the tone arm is elevated at the cutting angle the play-back needle is lifted up above the surface of the record. Conversely, when the tone arm pivot is lowered so that the tone arm is substantially in a horizontal position, the play-back needle engages the record surface while the cutting needle is elevated from the record surface.

This operation is performed simply by raising or lowering the pivot end of the tone arm and without the necessity for any manipulation of the stylus; thus, it can be permanently or semi-permanently mounted in the operating cartridge, being so arranged that it need not be replaced in changing from a cutting to a play-back operation and back again. The only movable mounting then required for the stylus is that which is necessary to facilitate replacement as the stylus wears out.

Thus, another object of my invention is the arrangement of the single stylus on the tone arm, the two needles and the pivot point of the tone arm being substantially linearly aligned with the pivot point of the vertically and horizontally movable tone arm, the shank of the cutting needle being offset in the direction of the pivot point so that the play-back needle can be mounted thereon.

These and other objects and advantages of my invention will become apparent in the following description and drawings in which.

Figure 1:
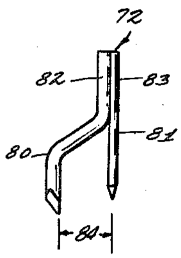
Figure 1 is a side view of the bifurcated dual purpose stylus of this invention.

Referring now to the figures, essentially the operation of the device is quite similar to that described in Patent No. 2,310,229 and the basic nature of the cutting and play-back operation is quite similar to that described in Patent No. 2,351,948. For this reason, and since the invention does not relate thereto, the drive motor and its connection to the turn table, the sound system including the amplifier, loud speaker, and microphone and the electrical connections including the selector switch for the various operations have been omitted from the drawings.

It is sufficient here to point out that the appropriate mechanical operation of the device requires that the turn table 10 is driven in any suitable manner at the appropriate recording or play-back speed; and one of the methods by which it may be driven is shown in Patent No. 2,351,948; the turn table 10 has a spindle 11 which rotates with the turn table in an appropriate bearing in the base plate 12. Spindle 11 is carried down into the gear box 13, where through an appropriate speed reduction gearing arrangement it drives the tone arm feed screw 14.

The tone arm 20 is pivotally mounted for rotation in a vertical plane on the pivot post 21, i. e., the tone arm 20 is actually a channel shaped member having the side flanges 22, 22 which are provided adjacent the rear thereof with the needle bearings 24, 25, one of which may be adjustable in order to permit simplified replacement of the tone arm and simplified adjustment of the bearing.

The needle bearings 24 and 25 engage appropriate openings in the channel shaped member 28, which is rigidly secured to the top of the pivot post 21. Pivot post 21 is in turn slidably and rotatably mounted in the journal 30 which is secured in an appropriate opening 31 in base plate 12. When the pivot post 21 is in the lower position of Figure 2, the washer 35 at the upper end of pivot post 21 rests on the upper surface of the journal 30 to limit the downward movement of the pivot post 21. The tone arm 20 is then in the lower or horizontal position of Figure 2.

A bracket 40 is provided beneath the base plate 12 adjacent the journal 30, the bracket having a spring latch 41 secured thereto. The lower end of the post 21 has secured thereto the feed arm 43 having the feed pawl 44. The feed arm 43 is reentrantly bent at 45 to provide a channel shaped section having the wall 46 through which a clamping screw 47 may be passed to secure the feed arm 43 to the lower end of post 21. The lower end of post 21 may be shouldered at 48 so that the feed arm 43 may be accurately positioned thereat. Section 45 of the feed arm 43 has an extension 50 which cooperates with the spring latch 41 when the pivot post 21 is raised to maintain the pivot post 21 in the raised position of Figure 3.

Figure 2:
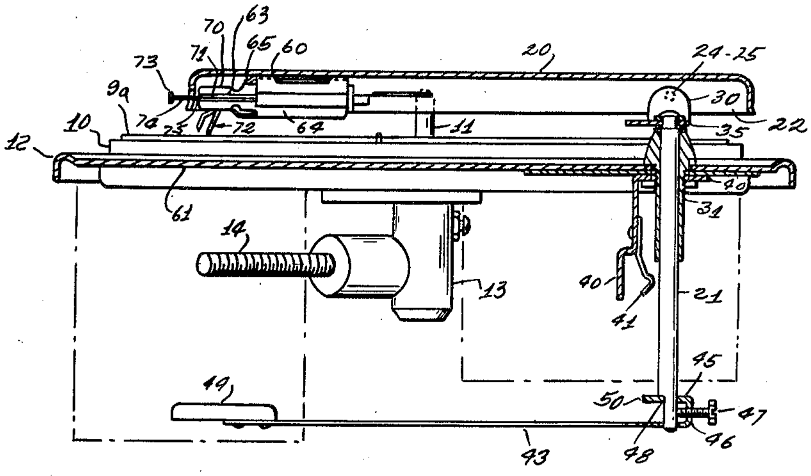
Figure 2 is a side view partly in cross-section of a tone arm incorporating the stylus of my invention positioned for playing back records.
Figure 3:
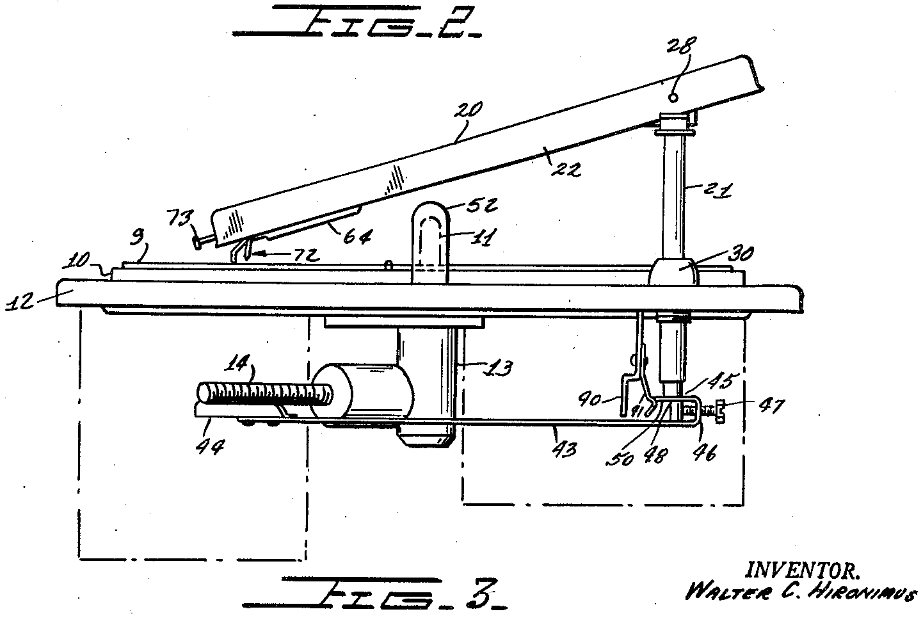
Figure 3 is a side view partly in cross-section of a tone arm incorporating the stylus of my invention positioned for cutting records.

The spring latch 41 is so arranged that it will support readily the load of the pivot post 21 and the tone arm 20; but hand pressure at the pivot area end of the tone arm 20 in a downward direction will serve to deflect the spring latch 41 and permit the pivot post 21 and the tone arm 20 to slide from the position of Figure 3 to the position of Figure 2.

When the tone arm 20 is in the position of Figure 2, which is the play-back position, the tone arm 20 is freely rotatable about its rear pivot, i. e., the pivot post 21 is freely rotatable in the journal and hence the tone arm may rotate freely in a horizontal plane for play-back purposes.

When the tone arm 20 and the pivot post 21 are raised to the position shown in Figure 3, then the feed pawl 44 on the feed arm 43 engages the feed screw 14. Now the tone arm 20 is no longer freely rotatable in a horizontal plane, but will move in a horizontal plane under the control of and as it is fed by the feed screw 14.

The feed screw is, as above pointed out, operated in accordance with the rotation of the turn table 10. Consequently, when the tone arm is raised to the record making position of Figure 3, it will traverse the record 9 on the turn table 10 only as predetermined by the rotation of the turn table 10. When the tone arm is moved down to the position of Figure 2, it is disconnected from the feed screw drive,—so that the horizontal traverse of the tone arm 20 will then be under the control of the grooves in the record **9*a* on the turn table 10. When the tone arm 20 is in the lowered position, it may also be swung outside the periphery of the turn table and rested on the tone arm rest 52 which is secured to the base plate 12**.

The tone arm 20 at its forward end is provided with the channel shaped spring bracket 60 having the detents 61, 62 adapted to receive and retain the peripheral flange 63 of the crystal cartridge 64 as shown particularly in Figure 2.

The forward end of the top wall of channel 60 carries the leaf spring extension 65 which bears against the top of the cartridge 64 ensuring that the cartridge 64 is held resiliently in the appropriate position for cooperation with the tone arm.

The forward section 70 of the cartridge 64 is provided with the opening 71 in which the dual purpose stylus 72 of my invention may be inserted to be clamped therein by the set screw 73 pressing through the opening 74 in the front wall of the tone arm 20 and the threaded opening 75 in the front of section 70 of cartridge 64.

Referring now to Figure 1, stylus 72 is made up of two needles, the cutter 80 and the reproducer 81. The cutting needle 80 has an offset shank 82 to which the reproducing needle 81 is secured in a suitable way, for example, soldering at 83 as shown in this particular embodiment of my invention.

In the cutting needle 80 the direction of the bend 82 is such that instead of pushing down into the record 9 it relieves the pressure so that only the weight of the operating cartridge 64 is the factor determining the depth of cut. Due to the fact that the cutting needle 80 is of such heavy material, putting a bend in its shank 82 does not produce any extra compliance along the plane of record 9. When the stylus 72 is clamped into the opening 71 of the cartridge 64, so far as reproducing is concerned, the cutting needle 80 appears only as a part of the mass of the crystal itself.

The reason for soldering needles 80 and 81 at 83 is that when they are not so soldered, high frequencies are lost because the relatively small diameter play-back needle 81 twists and moves around the point of the needle tightening screw 73.

Reproducing needle 81 as described below is so spaced with respect to the cutting needle 80 that in the horizontal position of the tone arm 20 it is lower than the cutting needle 80.

Consequently, as shown in Figure 2, only the reproducing needle 81 engages the record surface **9*a*, and the cutting needle 80 is elevated above the record surface 9*a***.

When, however, the rear end of the tone arm 20 is manually raised to the position shown in Figure 3 in which member 50 engages the spring latching detent 41, the relative positioning of the needles 80 and 81 is such that only needle 80 engages the record blank 9 while the play-back needle 81 is raised above the level of record blank 9.

In this manner the arrangement of the cartridge 64 and its dual purpose stylus is such that a change over from the record making to the record cutting position occurs simply by grasping the rear end of the tone arm 20 and leading it to the position of Figure 2 or pushing it down to the position of Figure 1.

The spacing 84 between the two needles 80 and 81 is determined by the fact that the rear end of the tone arm 20 is lifted as in application Serial No. 158,637 to bring the cutting needle 80 into contact with the record 9. Inasmuch as a certain minimum dimension clearance is needed on either needle 80, 81 when they are either in recording (Figure 3) or play-back position (Figure 2), the spacing 84 between the needles 80, 81 determines the amount of clearance. For example, if 20 mils is taken as the minimum clearance necessary for both cutting needle 80 and reproducing needle 81, the minimum spacing dimension 84 between the points of needles 80 and 81 would be $\frac{7}{32}$".

Appropriate switching arrangements such as that disclosed in Patent No. 2,351,948 may be utilized to switch the remaining portions of the apparatus so that their operation will be consistent with the position of the tone arm 20, or if desired, an appropriate switch may be provided to be engaged or operated by the latching spring 41 or in any other suitable manner in cooperation with the raising and lowering tone arm 20 to automatically select or arrange appropriate circuits to correspond with the function for which the tone arm 20 is set.

By this means, therefore, the need for changing needles when going from the cutting function to the play-back function is obviated. The user need merely raise the rear of the tone arm when he desires to make a record and push down the rear of the tone arm when he desires to play back a record. The stylus 72 need be replaced only when it is worn out.

In the foregoing I have described my invention solely in connection with a preferred illustrative embodiment thereof. Since many other methods of practicing my invention will now be obvious to those skilled in the art, I prefer to be bound not by the specific disclosures herein contained but only by the appended claim.

I claim:

In sound recording and reproducing apparatus; a tone arm carrying a sound translating element at one end and secured at the other end on a vertical post; said post being rotatable in a journal; said post carrying a feed arm; driving means for said feed arm; means for pivotally supporting said post in said journal in one position with the feed arm disengaged from its driving means; said post being slidably raisable in another position in said journal and means for pivotally supporting said post in said other position for engaging said feed arm with its driving means; said sound translating element having one stylus mounted therein, said stylus comprising a single shank and a pair of needles, said needles and said post being in substantially linear arrangement; the needle nearer said post being a reproducing needle, and the needle more remote from said post being a recording needle, the tone arm extending at an angle to the turn table when the post is raised and extending parallel to the turn table when the post is lowered; the recording needle engaging a record on said turn table when said post is raised; and the reproducing needle disengaging said record when the post is raised; the reproducing needle engaging a record on said turn table when the post is lowered; and the recording needle disengaging said record when the post is lowered.

References Cited in the file of this patent

UNITED STATES PATENTS

| | | |
|---|---|---|
| 1,816,831 | Dunning | Aug. 4, 1931 |
| 2,067,347 | Rysick | Jan. 12, 1937 |
| 2,195,758 | Rysick | Apr. 2, 1940 |
| 2,293,723 | Erickson | Aug. 25, 1942 |
| 2,310,229 | Gay | Feb. 9, 1943 |
| 2,351,948 | Gay | June 20, 1944 |
| 2,588,616 | Carlson | Mar. 11, 1952 |